United States Patent [19]

Cheng

[11] 3,915,653
[45] Oct. 28, 1975

[54] PRODUCTION OF CARBON BLACK
[75] Inventor: Paul J. Cheng, Bartlesville, Okla.
[73] Assignee: Phillips Petroleum Company, Bartlesville, Okla.
[22] Filed: July 8, 1974
[21] Appl. No.: 486,685

[52] U.S. Cl. .............................. 23/259.5; 423/456
[51] Int. Cl.² .......................................... C01B 49/00
[58] Field of Search ....23/259.5–259.9; 423/456–458

[56] References Cited
UNITED STATES PATENTS
2,924,512  2/1960  Webster et al. .................... 23/259.5
3,026,185  3/1962  Takewell et al. .................. 23/259.5
3,340,010  9/1967  Selfridge ............................ 23/259.5
3,411,885  11/1968  Malmstrom et al. ................ 423/456
3,490,869  1/1970  Heller ................................ 423/456

Primary Examiner—Carroll B. Dority, Jr.

[57] ABSTRACT

Carbon black is produced in a reactor which comprises a generally cylindrical combustion section followed by a reaction section. Hydrocarbon feed is introduced axially into the combustion section, and combustion gases are introduced into the combustion section in a direction generally tangential to the outer wall. One or both of the end walls of the combustion section slope inwardly.

9 Claims, 3 Drawing Figures

PRODUCTION OF CARBON BLACK

It is common practice to produce carbon black by furnace processes wherein a hydrocarbon feed oil is heated to an elevated temperature which serves to decompose the oil to produce carbon black. One such process which has been employed extensively in commercial operations employs a generally cylindrical combustion section followed by a generally cylindrical reaction section of smaller diameter. A hydrocarbon feed is introduced axially, and combustion gases are introduced tangentially into the combustion section. The reaction products are quenched and passed from the reaction zone to separation equipment.

In accordance with this invention, it has been found that carbon black having greater tint and lower structure can be produced in a reactor of the type described if at least the downstream end wall of the combustion section slopes inwardly from the perimeter of the wall toward the upstream end of the combustion section. The reaction section can be provided with a constriction, such as a venturi, to promote intimate mixing of the feed oil and combustion gases.

In the accompanying drawing.

Figure 2:
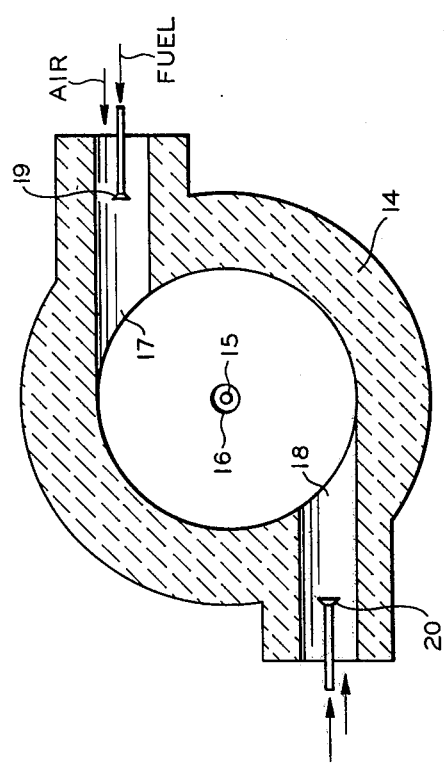
FIG. 2 is a view taken along line 2—2 in FIG. 1.
Figure 1:
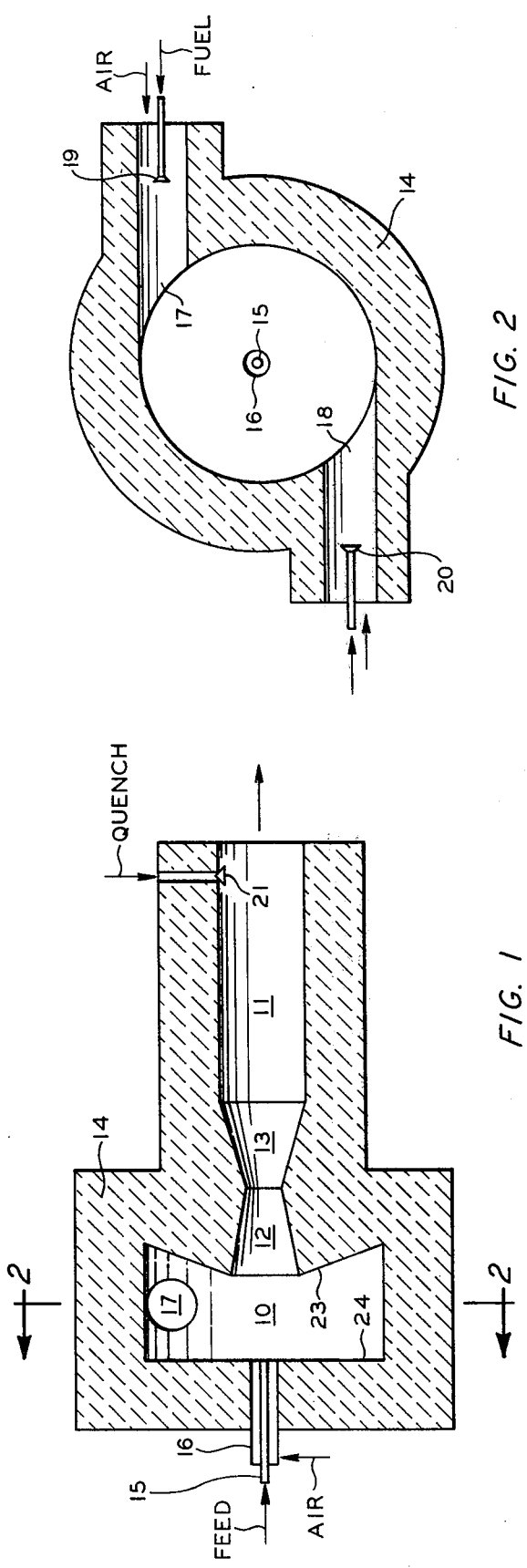
FIG. 1 is a schematic representation of a first embodiment of a carbon black-producing furnace of this invention.

Referring now to the drawing in detail and to FIGS. 1 and 2 in particular, there is shown a carbon black reactor which comprises a cylindrical combustion section 10 followed by a cylindrical reaction section 11. The reaction section can be provided with a converging section 12 and a diverging section 13. The combustion section and the reaction section are surrounded by a mass of ceramic insulating material 14. In order to simplify the drawing, a single layer of insulating material has been illustrated. However, in actual practice the insulation normally comprises two or more layers of ceramic which can be surrounded by a metal shell.

A tube 15 is positioned to introduce a hydrocarbon feed into section 10 generally along the axis of the reactor. Tube 15 is surrounded by a tube 16 through which an oxygen-containing gas, such as air, can be introduced. The end of tube 15 can be provided with a suitable nozzle to spray the feed into zone 10. Inlet tubes 17 and 18 are provided to introduce hot combustion gases into section 10 in directions generally tangential to the outer side wall. These tubes can be provided with respective fuel nozzles 19 and 20 which serve to introduce a gaseous or liquid fuel. Air is also introduced into tubes 17 and 18 to burn the fuel to provide hot combustion gases to supply heat to the reactor. A quench nozzle 21 can be positioned in the downstream end of reaction section 11. The gases removed from section 11 are passed to conventional separation equipment wherein the carbon black is recovered.

In accordance with this invention, the downstream end wall 23 of combustion section 10 slopes inwardly in the manner illustrated in FIG. 1. The angle at which the wall slopes inwardly from the outer wall, which is designated as angle A in FIG. 3, can be in the range of about 45° to about 85°. By use of such a sloping wall, carbon blacks are produced which have increased tint and lower structure.

Figure 3:
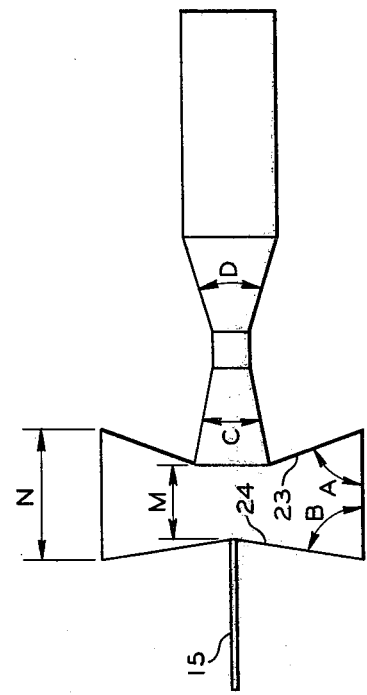
FIG. 3 is a schematic illustration of a cross-sectional view of a furnace showing additional embodiments of the invention.

The upstream wall 24 of combustion section 10 can be at right angles to the outer wall of section 10 as illustrated in FIG. 1, or this wall can slope inwardly as illustrated in FIG. 3. The angle B of FIG. 3 can vary from about 90° to about 45°. A constriction in the reaction zone is useful to promote mixing, although it is not essential. Such a constriction can be a venturi of the type illustrated in FIG. 1, or a venturi with a cylindrical throat, as illustrated in FIG. 3. If a venturi is employed, angle C of FIG. 3 can vary from about 15° to about 90°. Angle D of FIG. 3 can vary from about 7° to about 40°. The end of oil tube 15 can be flush with the upstream wall of the combustion section, as illustrated, or it can extend into the combustion section. The ratio of N:M is about 1.1 to 10, where M and N are the combustion section lengths shown in FIG. 3.

The furnace of this invention can be operated in the same manner as similar furnaces known in the art, but which do not have a sloping downstream wall in the combustion section. Suitable feeds and reaction conditions for such operations are described in U.S. Pat. Nos. 2,564,700, 2,865,717 and 3,235,334, for example, the disclosures of which are herein incorporated by reference.

A series of runs were carried out in three reactors. The first, designated "Reactor No. 1," was constructed in accordance with FIG. 1. Combustion section 10 had a diameter of 11 inches and a length N of 4 inches. Openings 17 and 18 had diameters of about 3 inches. Section 11 had a diameter of 3 inches. The diameter of the inlet of section 12 was 3 inches; and the diameter of the outlet of section 12 was 1.6 inches. In certain runs, the end of tube 15 was flush with the upstream wall of section 10. In other runs, designated "(a)", the end of tube 15 extended 2 inches into section 10. In this Reactor No. 1, angle B was 90°, angle A was 63.5°, angle C was 30°, and angle D was 16°. The second reactor, designated "Reactor No. 2", was of identical construction except that angle A was 90°. The third reactor, designated "Reactor No. 3," was identical to Reactor No. 2 except that sections 12 and 13 were cylindrical and had a diameter of 3 inches, thus eliminating the venturi.

In all of the runs, the feed was an aromatic hydrocarbon oil having a BMCI of 124. The fuel introduced through nozzles 19 and 20 was methane. Air was introduced tangentially through openings 17 and 18 and axially (surrounding the feed oil) through tube 16. All of the gaseous flows in the following table are expressed in standard cubic feet (SCF) per hour. The operating conditions and properties of the carbon black produced were as follows:

| Run No. | Reactor No. | Feed lb/hr | Tang. Gas SCF/hr | Tang. Air SCF/hr | Jacket Air SCF/hr | $N_2SA^{(b)}$ m²/g | $CTAB^{(c)}$ m²/g | $24M4^{(d)}$ cc/100 g | Tint$^{(e)}$ | Yield$^{(f)}$ |
|---|---|---|---|---|---|---|---|---|---|---|
| 1 | 1 | 84.1 | 255.6 | 9000 | 262.4 | 125 | 122.1 | 94.2 | 124 | 40.2 |
| 2 | 2 | 83.9 | 255.6 | 9000 | 262.4 | 134.3 | 123.5 | 100 | 106.6 | 41.6 |
| 3 | 3 | 84.1 | 255.6 | 9000 | 262.5 | 128.9 | 116.6 | 100.8 | 113.1 | 40.0 |
| 4 | 1 | 70.2 | 213 | 7500 | 219 | 128.1 | 121.4 | 90.3 | 124.7 | 41.2 |
| 5 | 2 | 69.8 | 213 | 7500 | 220 | 131.2 | 116.4 | 99.2 | 106 | 40.5 |

-continued

| Run No. | Reactor No. | Feed lb/hr | Tang. Gas SCF/hr | Tang. Air SCF/hr | Jacket Air SCF/hr | $N_2SA^{(b)}$ $m^2/g$ | $CTAB^{(c)}$ $m^2/g$ | $24M4^{(d)}$ cc/100 g | $Tint^{(e)}$ | $Yield^{(f)}$ |
|---|---|---|---|---|---|---|---|---|---|---|
| 6 | 3 | 70.2 | 213 | 7500 | 220 | 121 | 109.2 | 97.8 | 108.2 | 41.4 |
| 7 | 1$^{(a)}$ | 70.4 | 213 | 7500 | 219 | 127.2 | 125.9 | 86.7 | 127.2 | 39.4 |
| 8 | 2$^{(a)}$ | 70.4 | 213 | 7500 | 220 | 131.9 | 127.3 | 91.3 | 125 | 37.4 |
| 9 | 1 | 97.9 | 255.6 | 9000 | 262.4 | 104.5 | 101.4 | 89.6 | 119 | 46.1 |
| 10 | 1 | 81 | 213 | 7500 | 219 | 107.2 | 100.2 | 91.5 | 116.8 | 46.8 |
| 11 | 1$^{(a)}$ | 75.3 | 213 | 7500 | 219 | 112.3 | 112.5 | 83.8 | 123.8 | 43.4 |

$^{(a)}$Feed tube 15 extended 2 inches into section 10.
$^{(b)}$ASTM D3037-71-T, Method A.
$^{(c)}$Janzen, J. and Kraus, G., Rubber Chem. and Tech. 44, 1287 (1971).
$^{(d)}$U.S. Pat. No. 3,548,454, as measured after crushing by Method B, ASTM D2414-70.
$^{(e)}$Carbon black, zinc oxide and an oil type plasticizer are mulled together in such proportions that the ratio of carbon black to zinc oxide is 1 to 37.5 on a weight basis. Reflection measurements are made with a Welch Densichron apparatus from a film cast on a glass plate. Comparisons are made with N330 carbon black as a standard with an arbitrarily assigned value of 100. The reported values are thus indicative of the covering power of the black. High values indicate greater covering power.
$^{(f)}$Weight percent carbon black produced based on total carbon content of feed and fuel.

A comparison of Runs 1 to 3, 4 to 6, and 7 and 8 shows that carbon black of higher tint and lower structure (24M4) is produced in the reactor of this invention (Reactor No. 1) than in reactors not having a sloping wall 23. Runs 9 to 11 demonstrate the properties of carbon black produced in the reactor of this invention at different operating conditions.

While this invention has been described in conjunction with presently preferred embodiments, it obviously is not limited thereto.

What is claimed is:

1. A furnace adapted to be used in the production of carbon black comprising:
   a reaction section of generally circular cross section;
   a combustion section positioned upstream of and coaxial with said reaction section, said combustion section being provided with an outer generally cylindrical wall of diameter greater than the diameter of the inlet of said reaction section, an upstream wall and a downstream wall, said downstream wall sloping inwardly from said outer wall at an angle in the range of about 45° to about 85° with respect to said outer wall and toward said upstream wall;
   means to introduce a feed oil into said combustion section generally along the axis thereof and in a direction toward said reaction section; and
   means to introduce combustion gases into said combustion section in a direction generally tangential to the outer wall of said combustion section.

2. The furnace of claim 1 wherein the upstream wall of said combustion section is substantially perpendicular to said outer wall.

3. The furnace of claim 2 wherein said downstream wall slopes inwardly at an angle of about 63.5°.

4. The furnace of claim 3 wherein said reaction section is provided with a venturi adjacent said combustion section.

5. The furnace of claim 1 wherein said upstream wall slopes inwardly from said outer wall at an angle of up to about 45°.

6. The furnace of claim 1 wherein said means to introduce said oil is positioned to introduce the feed oil at a location adjacent the upstream wall of said combustion section.

7. The furnace of claim 1 wherein said means to introduce a feed oil is positioned to introduce the feed oil within said combustion section downstream from said upstream wall.

8. The furnace of claim 1 wherein said reaction section is provided with a venturi adjacent said combustion section.

9. The furnace of claim 8 wherein said venturi is provided with a cylindrical section at the throat thereof.

* * * * *